July 22, 1969     D. L. MALONEY     3,456,430
ELECTRIC ROTARY LAWNMOWER
Filed July 5, 1966     4 Sheets-Sheet 1
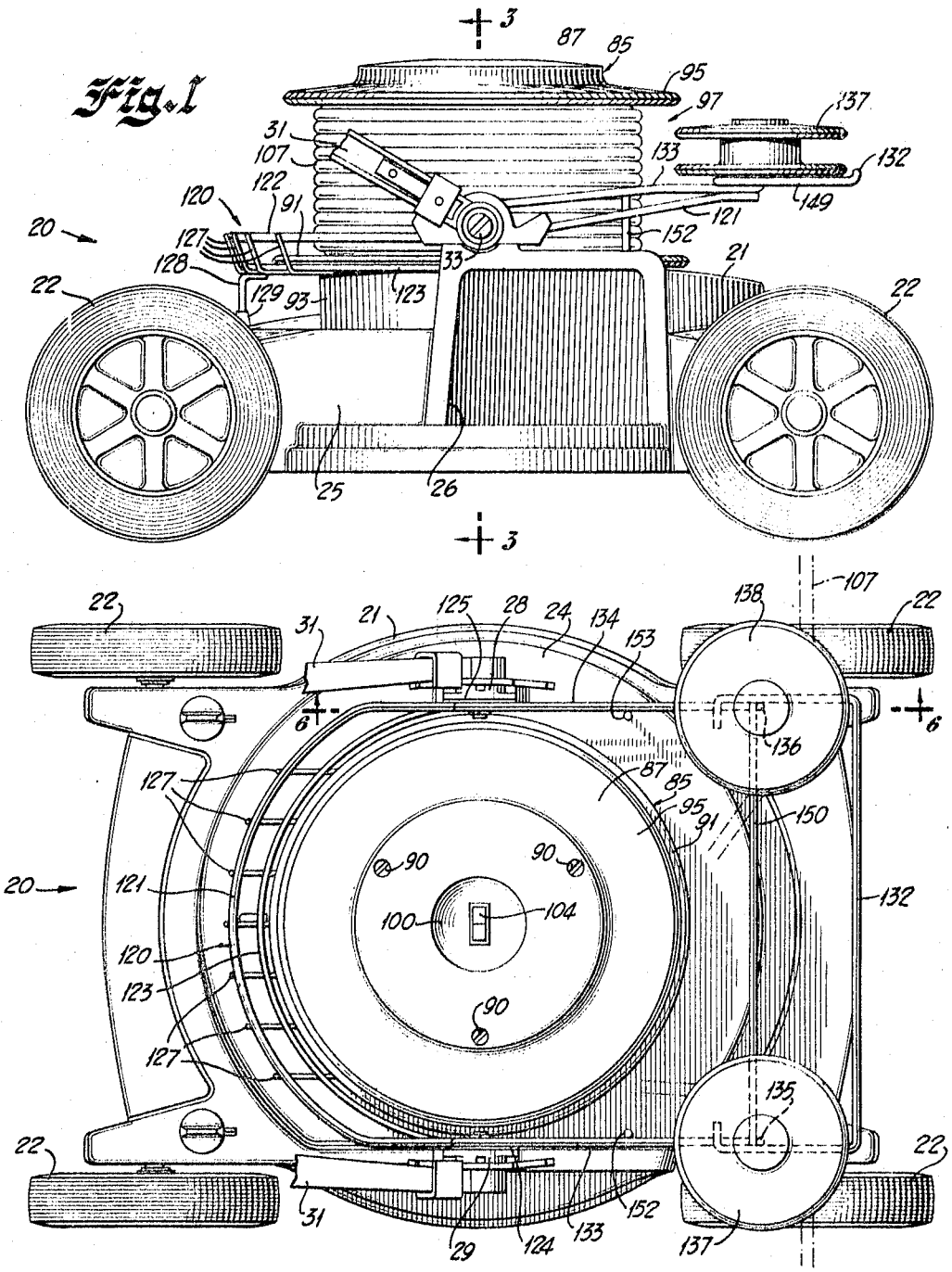
INVENTOR
DAVID L. MALONEY
by George R. Clark
ATTORNEY

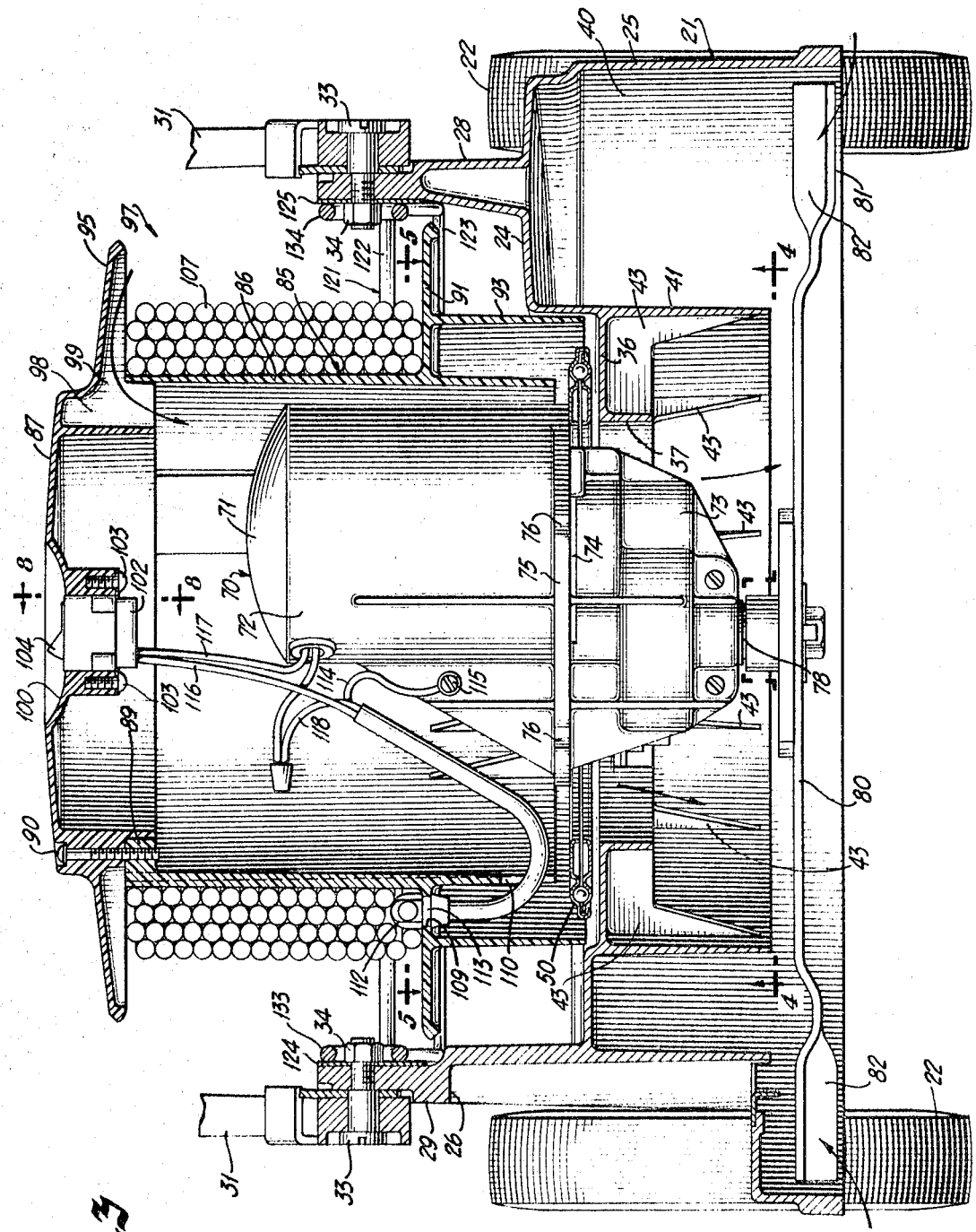

July 22, 1969  D. L. MALONEY  3,456,430
ELECTRIC ROTARY LAWNMOWER
Filed July 5, 1966  4 Sheets-Sheet 3
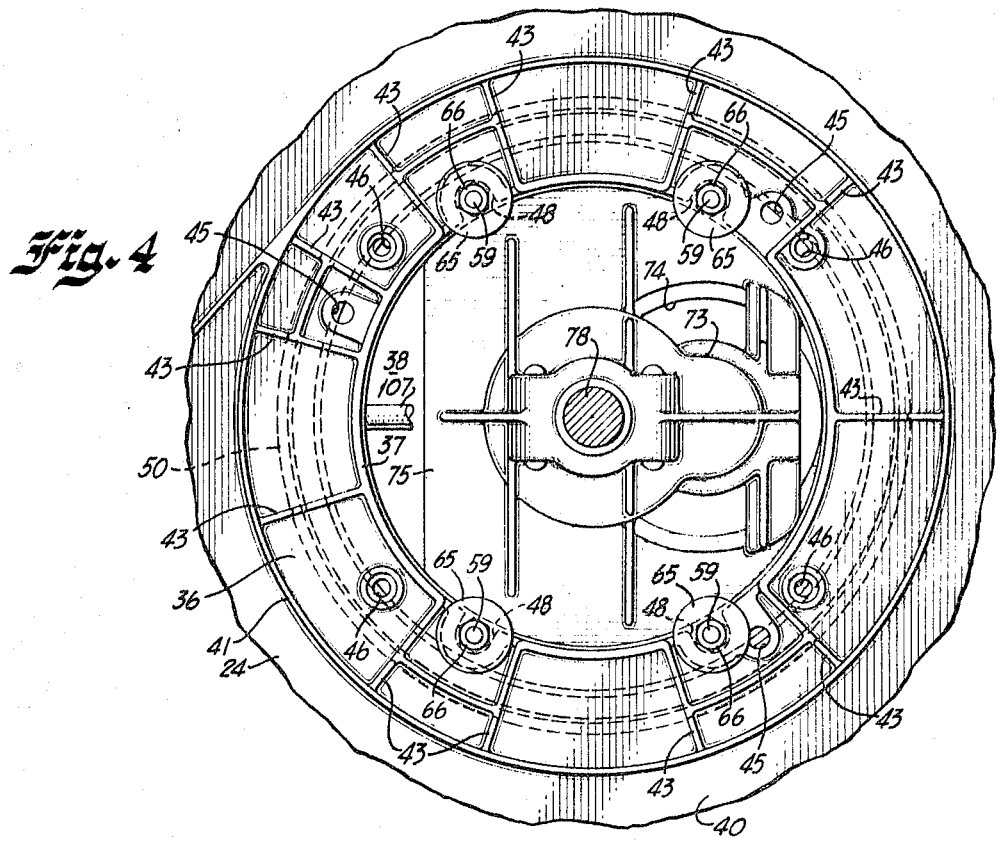
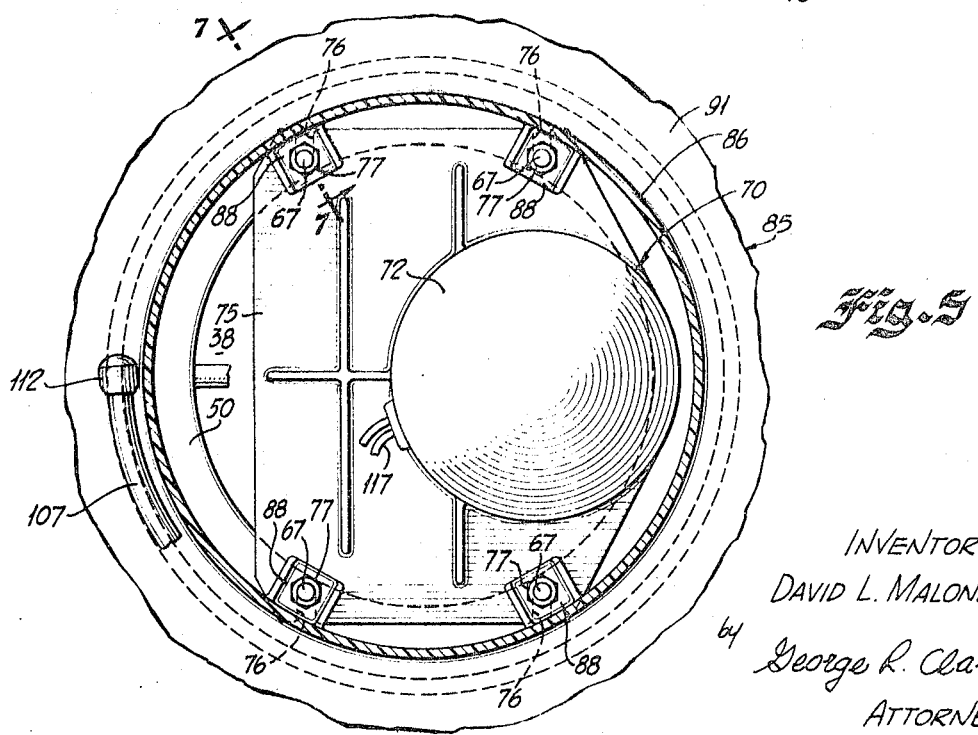
INVENTOR
DAVID L. MALONEY
by George R. Clark
ATTORNEY July 22, 1969   D. L. MALONEY   3,456,430
ELECTRIC ROTARY LAWNMOWER
Filed July 5, 1966   4 Sheets-Sheet 4
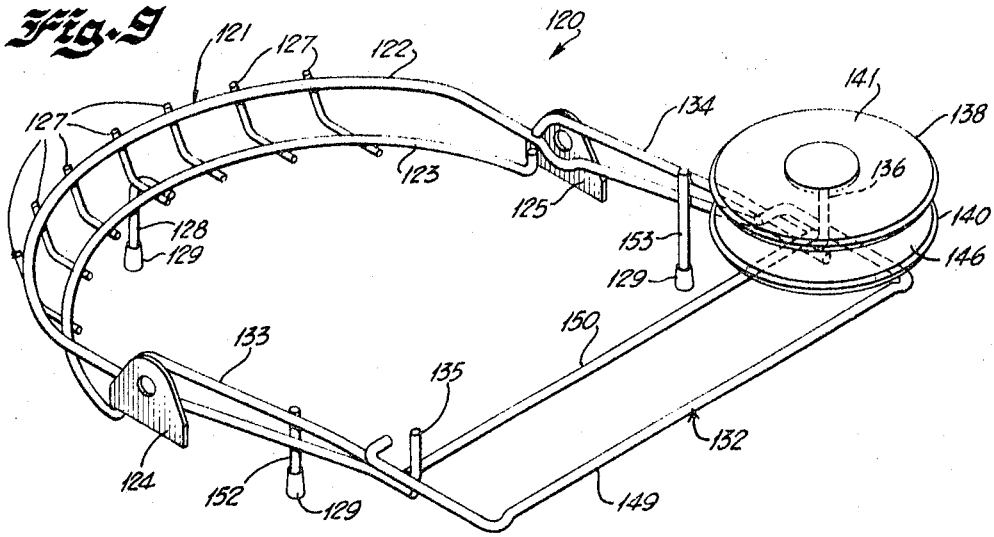
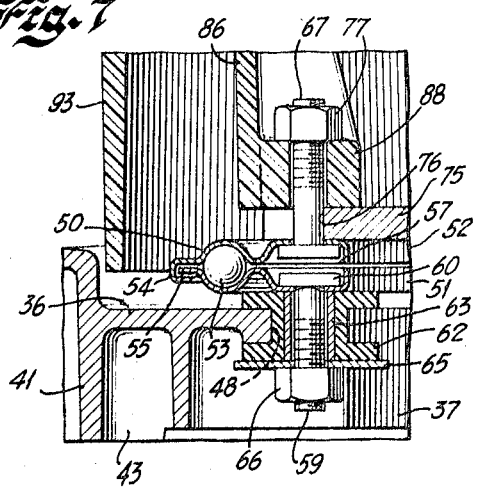
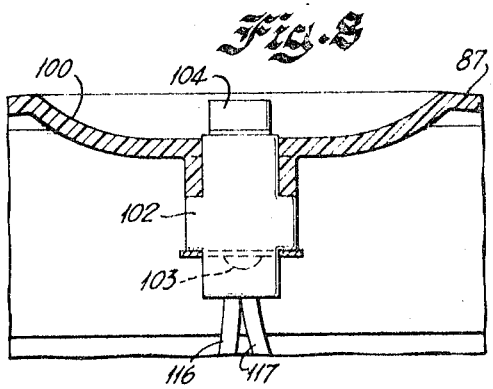
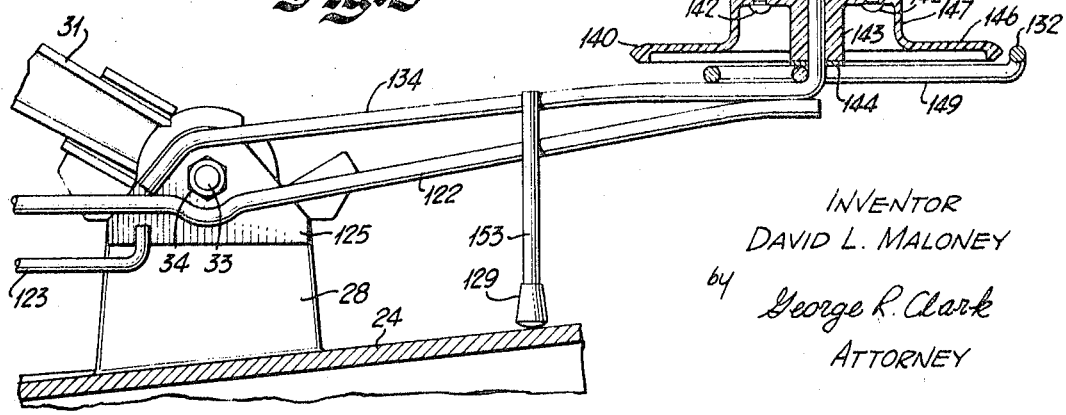
INVENTOR
DAVID L. MALONEY
by George R. Clark
ATTORNEY United States Patent Office 3,456,430
Patented July 22, 1969

3,456,430
ELECTRIC ROTARY LAWNMOWER
David L. Maloney, Oak Park, Ill., assignor to Sunbeam Corporation, Chicago, Ill., a corporation of Illinois
Filed July 5, 1966, Ser. No. 562,897
Int. Cl. A01d 35/26; B65h 59/00
U.S. Cl. 56—25.4                                18 Claims

ABSTRACT OF THE DISCLOSURE

A rotary lawnmower having an electric motor including a vertically depending drive shaft to which is attached a cutter and said motor being rotatably mounted to a housing which encloses the cutter whereby the rotation of the cutter causes a reaction for oppositely rotating the electric motor which is secured to an electric cord storage reel. Means are provided for guiding the cord onto the reel, and a single bearing is used to rotatably mount the motor to the lawnmower housing.

This invention relates to electric rotary lawnmowers and more particularly to electric rotary lawnmowers having improved means to recover and wind its power cord.

Most of the power operated lawnmowers sold today are of the rotary type wherein a power means mounted on a lawnmower deck or housing is used to rotate a horizontally disposed cutter. This type of lawn mower has the ability to cut all types of grasses and weeds. Inasmuch as the cutter is normally a relatively straight bar having sharpened leading edges, it is much more economical to manufacture than the reel type of lawn mower. The majority of rotary type lawn mowers sold today are powered by gasoline engines. While electrically powered rotary lawn mowers operate equally as well as those using a gasoline engine and, in fact, require less maintenance, there has been some reluctance on the part of consumers to purchase a lawn mower which requires a long power cord. It is felt by some people that there is a danger that the lawn mower might cut the power cord and thus, require the purchase of a new one. However, it is well recognized that the electric motor is more reliable and may be started with greater ease than a gasoline engine. Furthermore, the electric motor does not present a maintenance problem when the lawn mower is stored during a long period of nonuse, such as winter when the grass is dormant. Therefore, there is a need for an electric rotary lawn mower wherein the power cord is automatically recovered and wound on the lawn mower motor assembly.

In the prior art, there are rotary lawn mowers having an electric motor which is mounted on the housing by means of bearings so that the motor housing may rotate with respect to the lawn mower housing. The electric motor has an output shaft which extends into the lawn mower housing and which rotates a cutter, and a cord reel is secured to the housing of the electric motor so that the rotation of the cutter causes a reaction tending to rotate the motor stator and its supporting housing thereby winding the power cord on the reel. However, such prior art lawn mowers are expensive to manufacture and employ motor mounting means which make the lawn mower difficult to operate. Further, they do not provide an adequate means for feeding the electric power cord onto the reel.

Accordingly, it is an object of the present invention to provide an electric rotary power lawnmower having an improved cord recovery means which is inexpensive to manufacture and is easily operated.

Another object of the present invention is to provide a cord recovery rotary lawn mower wherein the electric motor is disposed in a reel housing and means is provided to adequately cool said motor.

Still another object of the present invention is to provide an electric cord recovery rotary lawn mower having an electric switch means for controlling the operation of the motor which means is conveniently located and low in cost.

It is an additional object of the present invention to provide an electric rotary lawn mower having a cord recovery means in which there is provided an improved arrangement for guiding the cord onto a cord reel.

Further objects and advantages of the present invention will become apparent as the following description proceeds and the features of novelty which characterize the invention will be pointed out with particularity in the claims annexed to and forming a part of the specification.

For a better understanding of the present invention, reference may be had to the accompanying drawings in which:

FIG. 1 is a side elevational view of an electric rotary lawn mower embodying the present invention wherein only the lower portion of the handle is illustrated;

FIG. 2 is a top plan view of FIG. 1;

FIG. 3 is an enlarged sectioned view taken along line 3—3 of FIG. 1;

FIG. 4 is a fragmentary view as taken along line 4—4 of FIG. 3;

FIG. 5 is a fragmentary sectioned view taken along line 5—5 of FIG. 3;

FIG. 6 is an enlarged fragmentary sectioned view taken along line 6—6 of FIG. 2;

FIG. 7 is enlarged fragmentary sectioned view taken along line 7—7 of FIG. 5;

FIG. 8 is an enlarged fragmentary sectioned view taken along line 8—8 of FIG. 3; and FIG. 9 is a perspective view of the guiding and supporting means for the power cord.

Briefly, the present invention relates to an electric rotary lawn mower having a housing which supports a bearing. An electric motor is rotatably mounted on the bearing and has an output shaft which extends into the housing for supporting a cutter thereon. A cord reel is rotatably mounted on the lawn mower housing and is in driving engagement with the motor. Thus, when an electric cord is attached to the reel and is in electrical connection with the motor, the rotation of the cutter by the motor produces a reaction which tends to wind the cord on the reel. An electric switch for controlling the motor is disposed on the cord reel at the center of rotation thereof so that the switch is always readily accessible. The connection between the power cord and reel allows the cord to pivot with respect to the reel and at the same time, holds the cord firmly to the reel. A cord guiding and supporting means is positioned on the housing to guide the cord onto the reel when the lawn mower is in operation. In addition, this means catches the cord if it falls off the reel when the lawn mower is not in operation in such a manner that the cord may easily be wound back on the reel once the lawn mower is in operation again.

Referring to the drawings in which like numerals designate like parts throughout the several views, the electric rotary lawn mower is designated generally by the reference numeral 20. The lawn mower includes a somewhat circular housing 21 which is supported at each corner by a wheel 22. Preferably, the housing 21 follows the construction disclosed in detail in copending patent application Ser. No. 562,666, filed July 5, 1966, and the preferred means for supporting wheels 22 on housing 21 is disclosed in detail in copending application Ser. No. 562,686, filed July 5, 1966, which matured into Patent No. 3,390,894, issued July 2, 1968. It should be appreciated, however, that the housing 21 includes a roof 24 and depending peripheral side wall 25 which defines an exhaust discharge opening 26. The roof 24 includes a pair of upwardly extending ears 28 and 29 for receiving a bifurcated handle 31, only lower portions of which are illustrated in the drawings. The handle 31 is held to the ears 28 and 29 by suitable bolts 33 and nuts 34. In addition, the housing roof 24 defines a flat annular wall 36 and a sleeve wall 37 which defines a central opening 38 in the housing. Moreover, the housing 21 forms an inclined channel 40 for conveniently conveying the grass clippings through the discharge or exhaust opening 26. The channel 40 is defined in part by an annular depending baffle 41. Inasmuch as the annular roof wall 36 bears a considerable weight, a plurality of strengthening ribs 43 are radially disposed and extend between wall 36, sleeve wall 37 and baffle 41.

Preferably, the housing 21 is die cast from a light metal, such as aluminum or magnesium and is cast as a single integrally formed part. Since it is desirable to have the housing 21 perform as a multiple purpose unit, it is designed in such a manner that it may receive a gasoline engine or an electric motor. As may be easily seen in FIG. 4, the annular roof wall 36 is provided with a plurality of openings 45 which may be used for mounting a gasoline engine to the housing. Moreover, a plurality of openings 46 are defined in wall 36 for receiving locking means to fasten a motor cover to the housing when the housing is used with an electric motor which is rigidly attached thereto. In addition, the wall 36 defines a plurality of notches 48 in front of which the sleeve wall 37 does not extend.

In accordance with the present invention, there is provided a thrust bearing 50 which is attached to the annular roof wall 36 of housing 21. The thrust bearing has the configuration of a ring and includes a lower race 51, upper race 52 and a plurality of steel balls 53. As may be best seen in FIG. 7, the upper race 52 has a U-shaped periphery 54 into which the outer edge of lower race 51 extends in order to form a tortuous path to prevent dirt particles and grass clippings from entering and coming in contact with balls 53. It should be appreciated that the inner portions of upper and lower races 52 and 51 are formed to provide a channel 57. A plurality of openings are formed in the channel section of lower race 51, and a plurality of studs 59 are welded thereto with the heads of the stud 60 resting inside bearing channel 57. The mounting studs 59 extend downwardly into notches 48. In order to dampen the vibration transmitted to the housing, rubber bushings 62 having a steel sleeve 63 receive the studs 59. The rubber bushing 62 engages in the notch 48 and the lower race 51 is securely held to the housing annular wall 36 by means of a plurality of washers 65 and nuts 66. In a somewhat similar manner, the upper race 52 has a plurality of studs 67 projecting upwardly from the bearing channel portion 57.

For the purpose of providing power for the lawnmower 20, there is provided an electric gear motor 70 having a casing or housing 71 with a motor portion 72 and a speed reducing portion 73. The detailed construction of the electric motor does not form a part of the present invention. However, it has an armature carrying a fan which is used to cool the motor. The cooling air enters the top portion of the casing 71 through openings (not shown) and exits downwardly through discharge openings 74. Preferably, the casing 71 has a split construction and has a horizontally disposed mounting wall 75 provided with a plurality of notches 76 which correspond to the notches 48 in housing annular wall 36. Therefore, when the electric gear motor 70 is in its proper operating position, the mounting wall 75 is located so that notches 76 receive the upwardly extending studs 67 from the upper race 52. Nuts 77 are used to rigidly lock the mounting wall 75 to the upper bearing race 52. With this construction, the electric gear motor 70 is mounted for rotation with respect to the housing 21. It should be appreciated that the speed reducing portion 73 of casing 71 extends through the bearing 50 and depends into the housing 21 through opening 38. Extending downwardly from the speed reducing portion 73 is an output shaft 78. Disposed within the housing 21 is a cutter 80 which is rigidly secured to the output shaft 78. Preferably, the cutter 80 is formed from steel stock and has sharp leading edges 81 for severing grass and foliages. Extending rearwardly from the sharp edges 81 are cutter vane portions 82 which, upon rotation of the cutter, cause air to flow upwardly and in a circular direction to carry the severed grass clippings and foliages out through discharge opening 26. Naturally, the rotation of cutter 80 creates a considerable load on the electric gear motor 70 inasmuch as the cutter is severing the foliage and moving a substantial volume of air through the discharge opening 26. Since the electric gear motor 70 is not rigidly anchored to the housing 21, there is a reactionary force on the motor which tends to rotate it on bearing 50. Thus, the motor tends to rotate in a direction opposite to the rotation of the cutter 80.

Surrounding and enclosing the gear motor 70 is a reel 85 having generally cylindrical side wall 86 and a cover 87. The cylindrical side wall 86 has a plurality of mounting bosses 88 through which stud 67 extends. Thus, as nuts 77 are drawn tight, the reel 85 is rigidly locked to the gear motor mounting wall 75. Therefore, when the motor 70 rotates on bearing 50, the reel 85 also rotates on the same vertical axis. The reel cover 87 is rigidly fastened to the cylindrical side wall 86 by means of a plurality of fastening screws 90 which extend through the cover 87 and lock into mounting bosses 89. Preferably, side wall 86 is molded from a suitable plastic and the mounting bosses 88 and 89 are integral therewith. Extending radially from reel side wall 86 is horizontal annular flange 91. Depending from flange 91 is a vertical annular skirt wall 93 for increasing the rigidity of reel 85 and forming a baffle for protecting bearing 50. The reel cover 87 is formed with a radially extending annular flange 95 which is spaced from and overlies flange 91. Thus, flange 95, flange 91 and the portion of the cylindrical side wall 86 extending therebetween forms a recess 97 for storing a power cord. The flange 95 has a plurality of depending spaced ribs 98 defining therebetween air inlet openings 99 through which air is drawn into the reel 85, as indicated by arrows in FIG. 3. Therefore, as the cutter 80 rotates, vane portions 82 cause a partial vacuum below skirt wall 41 drawing air from outside the mower through inlet openings 99 into the reel 85 and past electric gear motor 70. Subsequently, the air passes through bearing 50 into the housing 21. Thus, there is a constant flow of air downwardly past motor 70. As hereinbefore mentioned, motor 70 has air inlet openings near the top of casing 71 for permitting cool air to enter therein and the air is discharged through openings 74. Air egressing from openings 74 is immediately drawn into the housing 21 and discharged through housing opening 26.

The cover 87 is formed with a central depression or recess 100 which is adapted to receive an electrical control switch 102. The switch 102 is locked to the cover by a plurality of screws 103 and preferably, the switch is the rocker arm type. It should be appreciated that the depression 100 is sufficiently deep so that the rocker arm 104 of switch 102 does not extend above the depression and that the switch is substantially disposed on the center of rotation of reel 85. Therefore, even when the reel 85 is rotating or stopped at any position, the location of the switch 102 remains substantially constant and since the switch is disposed centrally on top of the reel, it is always readily accessible. Furthermore, inasmuch as the switch does not move with respect to the motor and reel, the wiring therebetween is relatively simple.

For supplying power to the electric gear motor 70, there is provided an electric power cord 107 which is wound around the reel 85 between the upper flange 95 and the lower flange 91 in recess 97. One end of the cord 107 has a standard plug (not shown) which is adapted to be received in a standard electrical outlet. In addition, it is desirable to provide a stake or some means for holding the remote end of the cord stationary in order that the reactive force on the reel does not pull the cord plug from the outlet. Inasmuch as any appropriate stake would be suitable for this purpose, it is not shown in the drawings. As indicated in FIG. 3, the cord 107 is wound around the reel 85 and extends through an opening 109 in flange 91 and through a slot 110 at the bottom of reel side wall 86 to emerge inside of the reel 85. A right angle connector 112 is received in flange opening 109 and has an opening through which the cord 107 passes. The fit between the cord 107 and the connector is such that the cord may not easily be removed from the connector once the connector is inserted in the flange 109. The connector 112 has a reduced diameter portion 113 positioned in opening 109 for permitting the connector 112 to pivot with respect to the flange 91. It should be appreciated that the right angle connector 112 bends the power cord 107 so that it extends from the flange 91 in a substantially horizontal plane and consequently, is easily wound around the reel 85. Since the cord 107 is bent at a right angle within connector 112, the connection therebetween is rigid when the connector is assembled to the flange and thus, the connector 112 acts as a strain relief for preventing the cord from being pulled out of the reel 85. Preferably, the power cord 107 contains three conductors, one of which 114 is connected to casing 71 by means of screw 115 for grounding purposes. Another conductor 116 is electrically attached to the switch 102 and the switch is in series with electric gear motor 70 by means of lead wire 117. Completing the circuit, cord conductor 118 is electrically connected with the motor 70 so that once the cord is attached to a power outlet, the switch 102 controls the operation of gear motor 70. When the lawn mower 20 is in operation, the reaction force on electric gear motor 70 tends to rotate the reel 85 causing the cord 107 to be wound thereon. However, the reaction force only creates approximately two pound pull on the cord so that the cord may be readily removed from the reel in operation. Thus, in mowing the lawn, the cord is removed from the reel 85 when the lawn mower is moving away from the stationary stake holding the cord near the plug end. However, when the lawn mower is advancing toward the stake or remote end of the cord, the reaction force on the reel tends to wind the cord 107 back on the reel 85 automatically.

In accordance with the present invention, the ring shaped bearing 50 is approximately the same diameter as the portion of the reel which supports the cord 107 and, consequently, the stresses imposed upon the bearing due to the weight of the reel and cord are rather moderate. In addition, the electric gear motor 70 is disposed so that the speed reducing portion 73 extends through the bearing into the housing 21 whereby the weight of the gear motor imposes a minimum amount of stresses upon the bearing. Therefore, in the present embodiment, only a single bearing is required to support rotatably the gear motor, reel and power cord.

For the purpose of winding the cord 107 on reel 85, there is provided a cord guiding and supporting assembly 120 which is illustrated in FIG. 9 with one roller removed. When the lawnmower 20 is turned off by actuating switch 102 or disconnecting the cord from the electrical outlet, there is a tendency, once the tension has been removed from cord 107, for it to unwind slightly and fall away from reel recess 97. In order to catch the cord over the low portion of the housing roof 24 which is spaced a considerable distance below reel flange 91, assembly 120 is provided with a basket section 121 comprising two parallel rods 122 and 123 which extend in a circular path parallel to the periphery of the lower flange 91. The lower rod 123 is attached at each end to brackets 124 and 125 which are locked to lawnmower housing ears 29 and 28 respectively, so that the bolts 33 and nuts 34 rigidly lock the brackets to the housing 21. It should be appreciated that lower rod 123 is disposed slightly below the flange 91 so that the rod may easily feed the cord back on the reel without wedging the cord between the rod and flange. A plurality of L-shaped fingers 127 extend between rods 122 and 123 and are disposed in planes parallel to the axis of rotation of reel 85. Thus, when the electric motor 70 is turned off, if convolutions of cord 107 fall off of reel 85 past flange 91, the cord convolutions are supported by the basket section 121 in a position where they may be easily rewound on the reel when the motor is started. It should be noted that the basket section 121 is disposed over the lowest portion of housing roof 24. The basket section 121 is maintained at the proper height by leg 128 which is welded to the basket section 121 and has a rubber tip or boot 129 which rests against the lawnmower roof 24.

For the purpose of guiding the electric cord 107 on reel 85, assembly 120 includes a guiding section 132 having rods 133 and 134 which are welded to brackets 124 and 125 respectively and are also welded to rod 122. Rods 133 and 134 have upturned forward ends 135 and 136 respectively upon which are rotatably mounted rollers 137 and 138 respectively. The rollers are identical and roller 138, which is best seen in FIG. 6, includes a lower part 140 and an upper flange part 141 which parts are held together by a plurality of screws 142. The lower part 140 includes a hollow hub 143 which is rotatably mounted on the rod upturned end 136 and held in position between a washer 144 and a fastener 145. In addition, the lower part 140 includes an outwardly extending flange 146 and a center circular portion 147. Welded to rods 133 and 134 is a U-shaped rod 149 which extends therebetween and is horizontally disposed between the rollers 137 and 138. In order to add rigidity to the guide section 132 and assist in guiding the cord 107, a rod 150 is welded to rods 133 and 134. With this construction, it should be noted that the U-shaped rod 149 passes closely underneath rollers 137 and 138 and the portion thereof which extends between the rollers is bent upwardly so that it extends horizontally at approximately the same height as the roller flange 146 whereby the cord may be easily fed into the rollers from rod 149 and will not be wedged or caught therebetween.

In operation the cord 107 extends from the reel 85 between rollers 137 and 138 and normally rests upon rods 149 and 150. In maneuvering the lawnmower 20, the cord 107 will slide along the rods 149 and 150 and engage the rollers 137 and 138. In FIG. 2, the cord 107 is illustrated by broken lines in positions where the cord extends at right angles to the line of travel of the lawnmower and thus, the cord engages with the rollers 137 and 138. It will be appreciated that when the cord is being withdrawn from the reel or when it is being wound onto the reel, the cord will be maintained either in contact with one of the two rollers or along the rods 149 and 150. In order to maintain the guide section 132 at the proper height with respect to the reel 85, there are provided legs 152 and 153 which are of similar construction to leg 128.

From the foregoing, it can be seen that the cord recovery system herein disclosed provides a simple and inexpensive arrangement for controlling the electric power cord during the operation of the lawnmower. Provisions are made to permit the power cord to be withdrawn from the cord reel and also to automatically wind the cord back onto the reel. In addition, there is provided means for catching and supporting the cord if it falls off the reel when the motor stops and holding it in a position where it can automatically be wound back onto the reel when the lawn mower is again put into operation.

While there has been illustrated and described one embodiment of the present invention, it will be obvious to those skilled in the art that various changes and modifications thereof may be made and it is intended in the appended claims to cover all those changes and modifications as fall within the true spirit and scope of the present invention.

What is claimed as new and desired to be secured by Letters Patent of the United States is:

1. An electric rotary lawnmower comprising a housing having a open bottom, a horizontally disposed ring-shaped bearing being secured to said housing, electric motor means enclosed by a casing having outwardly extending mounting wall means, said motor means including an output shaft, said wall means being secured to said bearing so that said casing is solely supported for rotation by said bearing, a cutter horizontally disposed within said housing and attached to said shaft, a reel secured to said casing for rotation therewith, and an electric cord for supplying power to said motor means being attached to said reel whereby the rotation of said cutter by said motor means produces a reaction which tends to wind said cord on said reel, said motor means being positioned substantially within the vertically projected confines of said bearing and extending therethrough.

2. The lawnmower of claim 1 wherein said bearing including an upper and lower race, said lower race attached to said housing and said upper race secured to said casing wall means, said reel being circular and approximately the same diameter as said bearing.

3. The lawnmower of claim 2 wherein said bearing is spaced radially outwardly from said output shaft so that an air passageway is defined between said bearing and said casing, said reel enclosing said casing and being provided with air inlet openings spaced above said casing whereby the rotation of said cutter induces air flow through said reel air inlet openings and passageway into said housing so that air can flow to said casing for cooling purposes.

4. The electric lawnmower of claim 1 wherein said motor means includes an electric motor and a speed reducing means in power transmitting relationship with said electric motor, said casing including an upper motor portion containing said motor and lower speed reducing portion containing said speed reducing means, said mounting wall means extending horizontally in a plane between said casing portions so that said motor portion is substantially above said bearing and said speed reducing portion is substantially below said bearing.

5. The lawnmower of claim 1 wherein said motor means including speed reducing means, said speed reducing means extending through said bearing and being disposed within said housing.

6. An electric rotary lawnmower comprising a housing supporting bearing means, an electric motor having a casing secured to said bearing means for rotation with respect to said housing, said motor being provided with a depending output shaft disposed within said housing, a cutter within said housing and attached to said shaft whereby the reaction to the rotation of said cutter tends to rotate said motor casing, a reel enclosing and secured to said motor casing, an electric cord attached to said reel and in electrical connection with said motor so that the rotation of said motor casing winds said cord on said reel, an electric switch for controlling said motor disposed on said reel at the center of rotation thereof.

7. The lawnmower of claim 6 wherein said reel having inverted cup-shaped configuration with circular side wall means and a roof portion, said roof portion forming a central recess into which said switch is received.

8. The lawnmower of claim 7 wherein said roof portion defines an annular radially extending upper flange, said side wall means including an annular radially extending lower flange spaced below said upper flange whereby said cord is windable around said side wall means between said flanges, said wall means including strengthening means below said lower flange for increasing the rigidity of said reel.

9. The lawnmower of claim 6 wherein said reel is provided with air inlet opening above said motor, said reel defining in part an air passageway from said air inlet opening to said motor and from said motor to said housing whereby the rotation of said cutter draws cooling air to said motor.

10. An electric rotary lawnmower comprising a housing carrying a bearing, an electric motor having a casing supported for rotation by said bearing with respect to said housing, a cutter disposed within said housing and operatively attached to said motor for rotation therein, a reel secured to and rotatable with said motor casing, said reel including an outwardly extending flange, an electric power cord attached to said reel and in electrical connection with said motor so that the rotation of said cutter causes a reactionary force which tends to rotate said motor casing winding said cord on said reel, said cord passing through an opening in said reel flange to said motor, and means disposed within said flange opening which receives said cord and is pivotable with respect to said flange, said means locking said cord to said flange.

11. The lawnmower of claim 10 wherein said means bending said cord approximately at a right angle at said flange so that said cord extends perpendicular to the rotation of said reel upon emerging from said reel thereby assisting said cord to wind on said reel.

12. The lawnmower of claim 10 wherein said means pivots on an axis parallel to the rotation of said reel.

13. An electric rotary lawnmower comprising a housing, an electric motor having a casing rotatably mounted to said housing, a cutter within said housing secured to said motor for rotation, a reel mounted for rotation with respect to said housing and in driven relationship with said motor, an electric power cord windable on said reel and in electric connection with said motor whereby the rotation of said cutter causes a reaction which tends to rotate said motor casing for winding said cord on said reel, and means secured to said housing for guiding said cord onto said reel, said means including a member extending perpendicular to the axis of reel rotation and spaced from said reel so that said cord can pass over it and be vertically guided thereby, two laterally spaced rollers rotatably disposed adjacent said member on axes parallel to the axis of reel rotation whereby said cord passes between said rollers for horizontal guidance.

14. The lawnmower of claim 13 wherein said reel being provided with an outwardly extending annular flange for guiding and supporting said cord, said means including a basket section which extends adjacent to said flange for supporting said cord and feeding it onto said reel.

15. The lawnmower of claim 14 wherein said basket section comprising two spaced arcuate elements which extend parallel to said flange with one above and the other below said flange, and a plurality of L-shaped fingers extending normal to said elements and secured thereto for supporting said cord.

16. The lawnmower of claim 14 wherein said means being provided with a plurality of feet which rest upon said housing and supports said basket section, rollers and member.

17. The lawnmower of claim 13 wherein said rollers each include an outwardly extending annular flange, said member disposed below said flange and being bent so that the portion of said member extending between said rollers is approximately aligned with said flanges.

18. The lawnmower of claim 13 wherein said housing having a pair of upwardly extending ears for receiving a handle, said means being secured to said housing ears.

References Cited

UNITED STATES PATENTS

| | | | |
|---|---|---|---|
| 548,378 | 10/1895 | Maertens | 308—135 |
| 2,498,609 | 2/1950 | Reil | 56—26 |
| 2,566,512 | 9/1951 | Bilderbeck | 56—25.4 |
| 2,643,502 | 6/1953 | Flanigan | 56—25.4 |
| 2,720,560 | 11/1955 | Funk | 56—25.4 X |
| 2,728,182 | 12/1955 | Fulton et al. | 56—25.4 |

ANTONIO F. GUIDA, Primary Examiner

PASQUALE A. RAZZANO, Assistant Examiner

U.S. Cl. X.R.

242—45